United States Patent
Assadi (10) Patent No.: US 9,141,608 B2
(45) Date of Patent: Sep. 22, 2015

(54) DATA VALIDATION IN DOCKETING SYSTEMS

(75) Inventor: Mehrdad Assadi, Alexandria, VA (US)

(73) Assignee: PATRIX IP HELPWARE, Alexandria, VA (US)

(*) Notice: Subject to any disclaimer, the term of this patent is extended or adjusted under 35 U.S.C. 154(b) by 968 days.

(21) Appl. No.: 12/964,649

(22) Filed: Dec. 9, 2010

(65) Prior Publication Data
US 2011/0218980 A1 Sep. 8, 2011

Related U.S. Application Data

(60) Provisional application No. 61/285,094, filed on Dec. 9, 2009.

(51) Int. Cl.
*G06F 17/30* (2006.01)

(52) U.S. Cl.
CPC .......... *G06F 17/30* (2013.01); *G06F 17/30356* (2013.01)

(58) Field of Classification Search
CPC ................................................ G06F 17/30356
See application file for complete search history.

(56) References Cited

U.S. PATENT DOCUMENTS

| | | | |
|---|---|---|---|
| 2002/0169972 A1* | 11/2002 | Tanaka et al. | 713/193 |
| 2005/0289182 A1* | 12/2005 | Pandian et al. | 707/104.1 |
| 2006/0053182 A1* | 3/2006 | Sen et al. | 707/204 |
| 2008/0263097 A1* | 10/2008 | Manson et al. | 707/104.1 |
| 2009/0094273 A1* | 4/2009 | Uchida | 707/102 |
| 2009/0112883 A1* | 4/2009 | Yoshioka | 707/10 |
| 2009/0125856 A1* | 5/2009 | Acuna et al. | 716/5 |
| 2009/0208003 A1* | 8/2009 | Matsukawa et al. | 380/44 |
| 2009/0254393 A1* | 10/2009 | Lollichon | 705/7 |
| 2011/0106775 A1* | 5/2011 | Arbo et al. | 707/695 |

* cited by examiner

*Primary Examiner* — Mohammad S Rostami
(74) *Attorney, Agent, or Firm* — Birch, Stewart, Kolasch & Birch, LLP (57) ABSTRACT

A data validation system and method for a fully or partially automated docket management solution. The system may require single-user double entry and/or double user data re-entry for validation and confirmation of data content. Un-validated/un-confirmed data may be quarantined or otherwise hidden from part or all of the rest of the docket management system.

20 Claims, 8 Drawing Sheets

DATA VALIDATION IN DOCKETING SYSTEMS

PRIORITY

The present application claims priority to provisional application 61/285,094, filed with the United States Patent and Trademark Office on Dec. 9, 2009, the entire contents of which are hereby incorporated by reference.

BACKGROUND

In many electronic record-keeping and process-management systems, the added functionality of customizable data fields and data entry validation procedures may provide significant advantages in terms of workflow efficiency and data quality. Especially in systems such as docket-management solutions for law firms, data quality is essential as accurate information is the cornerstone of effective scheduling and processing. A missed date or incorrect instruction may lead to missed deadlines, late fee payments, loss of client rights, and potentially severe liability for the law firm. To solve these and other problems, a solution is provided to the data quality concerns of law firms and legal professionals. Embodiments of the solution provide approaches where data validation and verification procedures may be built into docketing workflows without undue burden on individuals and without significant duplication of work.

SUMMARY

A data validation and confirmation system for fully or partially automated management of docket data is discussed herein.

Fully and partially automated docket data and docketing systems serve an essential purpose in automating and tracking data in a law office. They are used to keep track of important dates and deadlines, track work progress, and monitor client communication. A docketing system, however, is only as good as the data that it contains. Inaccurate data in a docketing system leads to incorrect information, missed deadlines, and further negative consequences. Aspects of the solution discussed herein include a data validation and data confirmation system and associated method for ensuring data quality in a docket management system in order to prevent mishandling of client cases as a result of incorrect data in the system.

One variation of a docketing management system may include a first data input interface; a second data input interface; an accessible data storage portion an interface data storage portion; and a data validation portion. The interface data storage portion stores first docketing data received via the first data input interface, the data validation portion compares second docketing data received via the second data input interface to the data stored in the interface data storage portion, and the data stored in the interface data storage portion is moved to the accessible data storage portion upon a comparison result where the first docketing data matches the second docketing data.

In some variations, the first data input interface is configured such that the first docketing data must be input a first time and a second time. In such variations, the data input the first time must match the data input the second time before the first docketing data can be sent to the interface data storage portion.

In some variations, the data stored in the interface data storage portion is identified as suspect data upon a comparison result where the first docketing data does not match the second docketing data. In yet further variations, the first data input interface includes a validation check portion that compares the first docketing data against one or more validation parameters and prevents the first docketing data from being stored in the interface data storage portion if the validation parameters are not met. In some variations, the validation parameters may include data format requirements (such as specific formats for dates), value range requirements (such as a minimum or maximum deadline time or a valid/invalid date range), and flags indicating if a field is improperly left blank.

One variation of a method of validating docketing information may include the steps of receiving, via a first data entry interface, a first version of docketing data; storing, in an un-validated data storage area, the first received data; receiving, via a second data entry interface, a second version the docketing data; comparing the second version to the stored first version; validating the stored first version as validated data when the second version matches the stored first version during the comparing; and requiring re-submission of either the first or second version when the second version does not match the stored first version during the comparing.

In another variation of the method, validating includes moving the validated data into a validated data storage area and making the validated data openly accessible. In yet another variation, receiving the first version of docketing data includes receiving a first entry of the docketing data and receiving a second entry of the docketing data. In such a double-entry system, the first version of the docketing data is received only if the first entry matches the second entry. In further variations still, receiving the second version of the docketing data includes receiving a third entry of the second version docketing data and receiving a fourth entry of the second version docketing data. The second version docketing data is received only if the third entry matches the fourth entry in such a variation.

In some variations of the method, a first mismatch between the first and second entries causes the first and second entries to be cleared such that the first and second entries must be repeated. In further variations, a third mismatch between the first and second entries causes the first data entry interface to become locked out of further entry attempt until unlocked by an administrative-level user. In yet further variations, requiring re-submission includes a data quarantine procedure where either the first or second version of the docketing data is isolated and reviewed to determine accuracy and correctness.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Embodiments of a data quality solution will be discussed in the context of a sample system. The system used as an exemplary embodiment is the Patricia® intellectual property docketing and workflow management system. A brief background on the function of the existing system is presented for proper context and understanding of the impact of the data quality solution.

Figure 1A:
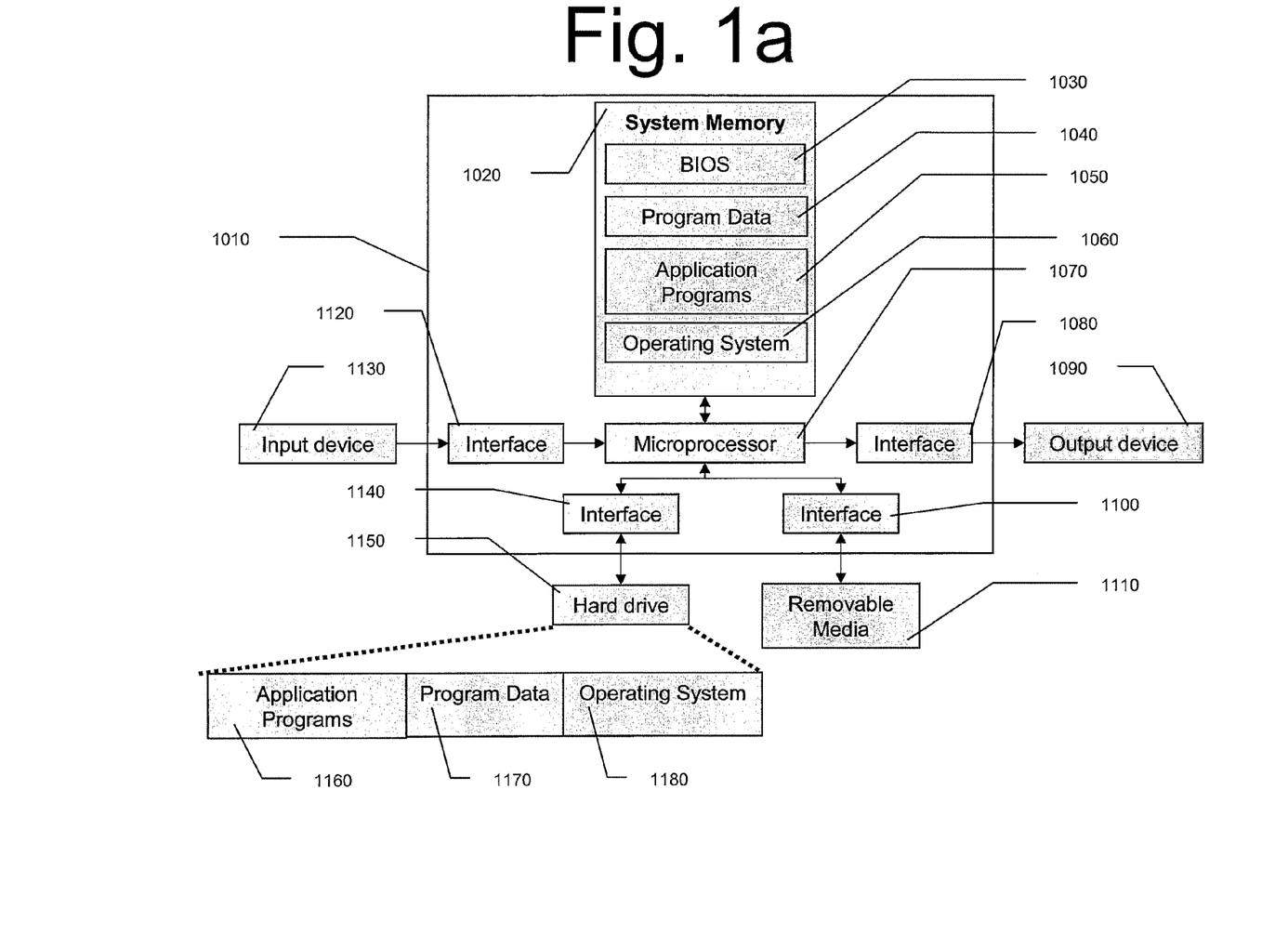
FIG. 1a shows an embodiment of a computer system for utilizing a docketing data validation system as described herein.

Embodiments of the Patricia® system may be implemented on a general-purpose computer, on client-server systems/architectures, on special-use or custom-build hardware, or on some combination thereof. An embodiment configured for use in conjunction with either a special-use or a general purpose computing device is depicted in FIG. 1a.

A general purpose or special-use computer system 1010 may include a system memory 1020, a microprocessor 1070, input and output devices 1130, 1090 with associated interfaces 1120, 1080, a hard drive 1150 or other non-volatile data storage area with an associated interface 1140, and possibly a removable media device 1110 such as a disc or tape drive or hot-swappable hard drive with an associated interface 1100. The data storage area 1150 may store application programs 1160, program data 1170, and an operating system 1180. Depending on the type of computer system 1020, a Patricia® embodiment may be an application program 1160 with associated program data 1170. When executed, such an embodiment may be loaded into system memory 1020 as an application program 1050 with associated program data 1040. The BIOS 1030 may govern how such an application is loaded into system memory and the operating system 1070 may govern execution and operation of the application program 1050 and access to/loading of program data 1040 into system memory during operation.

Figure 1B:
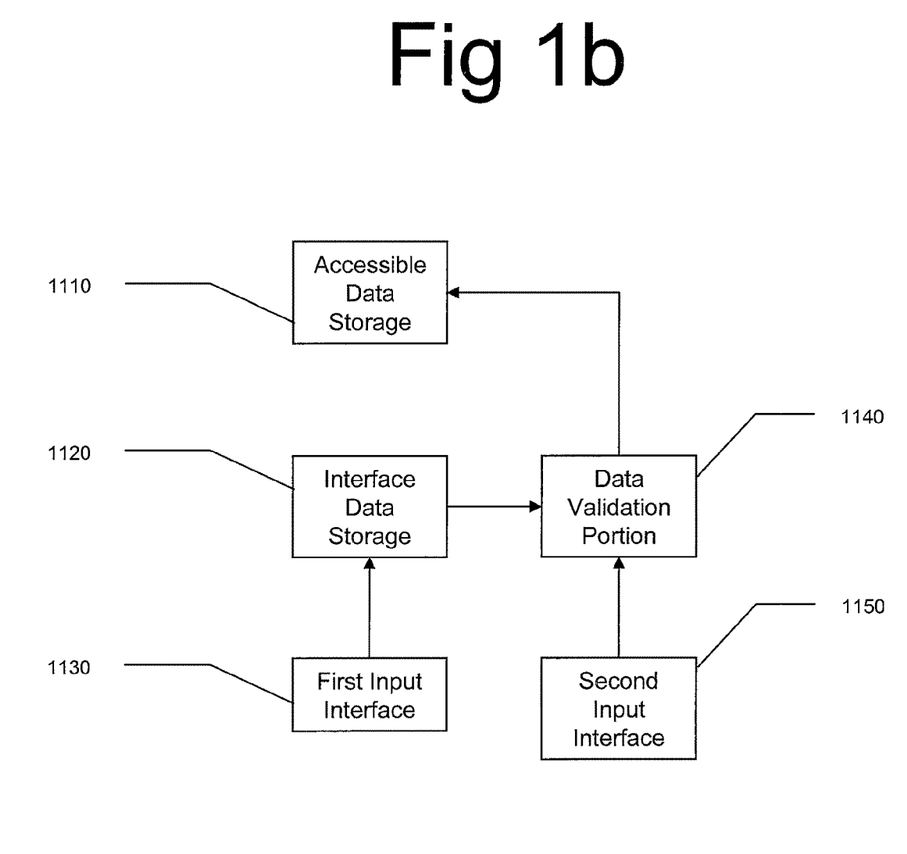
FIG. 1b shows an embodiment of a functional block diagram of a docketing data validation system as described herein.

From a functional organization standpoint, there are components of such a system that will be present regardless of the system type or embodiment employed. A block diagram showing these components and their relationship is depicted in FIG. 1b. A first input interface 1130 allows an initial input of data from a first source or user via an input device or data channel into an interface data storage area 1120. The input interface 1130 may include some underlying, associated, or inherent logic capability for up-front data processing. In some variations, the input interface may include a user-interface utility for data entry, such as an application screen, and the associated control logic to ensure that data is properly entered into the user-interface utility. The interface data storage area 1130 holds this first input data until such time as it can be confirmed/validated. Variations of the storage area 1130 may include volatile storage such as random-access memory (RAM), magnetic storage media such as a hard drive or flash memory, optical storage media such as a CD-ROM or DVD, or other suitable data storage formats.

Variations of a first input interface 1130 with logic capability or with associated data validation logic may include arrangements that require double entry of data to check for internal consistency. Further variations may include arrangements or configurations that have data format and/or value range checks to ensure that a data field is not left blank or populated with invalid data. Yet further variations may include administrative override capabilities associated with the format and value checks, and further variations still may include lockout features that block further data entry after a certain number of failed entry attempts.

A second input interface 1150 allows input of confirmation data from a second source or user into a data validation portion 1140. The second input interface may be configured in ways and variations similar to those of the first input interface. It may also have internal data consistency checking features such as double entry, format requirements, and/or value range requirements. The second input interface may also be configured such that it allows the second source or user to identify the time, date, and source of the initial data input being stored in the interface data storage portion 1120.

The data validation portion 1140 compares the data from the second input interface 1150 against analogous data in the interface data storage portion 1120. If the comparison returns a valid/acceptable result, the validated/confirmed data is moved to an accessible data storage portion 1110 which is visible to the rest of the system. If the comparison returns an invalid or unacceptable result, correction procedures may be initiated to determine if the incorrect data was provided via the first input interface 1130 or the second input interface 1150. In some variations, a lock on further data comparisons may be implemented to ensure data quality. Once data is confirmed in the data validation portion 1140, it moves to an accessible data storage 1110 where it is available to the rest of the system as correct and valid data.

In an embodiment of the Patricia® system, a combination of four variables may be used to define each matter. These four variables may determine things like application type, country, service level and case type. Each combination of these variables has an associated diary matrix, although some diary matrixes are shared. The diary matrix establishes a set of diary fields and the diary fields may have associated rules. Diary fields may represent particular data values such as filing date, receipt date, deadline or other date-related items as well as other data types such as identification numbers, country, and various other data concerning the matter. These diary fields may also have rules governing who may enter data and see data in these fields. An example of a diary field user interface setup utility is depicted in FIG. 2a.

In the interface shown, a diary field may include a label 2001, which is the name of the field, a type 2011, which is a general label category, and an application role 2021, which is a field related to the protections and permissions associated with diary field data based on user type. One particular property of these diary fields is the ability of administrators and other admin-level users to create customized diary fields or modify rules associates with each diary field and actions associated with population of a particular diary field.

One of the particular customizations available for these diary fields is the ability to require that data in a diary field be validated or verified. This may be accomplished by setting the "confirmation required" 2031 property of the diary field. In the particular embodiment discussed, each diary field may have an associated validation step. Other embodiments may allow for double, triple, or even further levels of verification depending on the sensitivity of the data and the data quality requirements. This is in addition to any system-based rules for data fields where entries of data are validated to prevent known or common errors (such as entering docketing due-dates that occur before the date of entry, submitting country names for countries that do not exist or are otherwise unrecognized by the system, requiring selection from a drop-down list or similar menu-driven structure or selection from a calendar display, prevention of blank data fields, data masking, etc.)

Figure 2A:
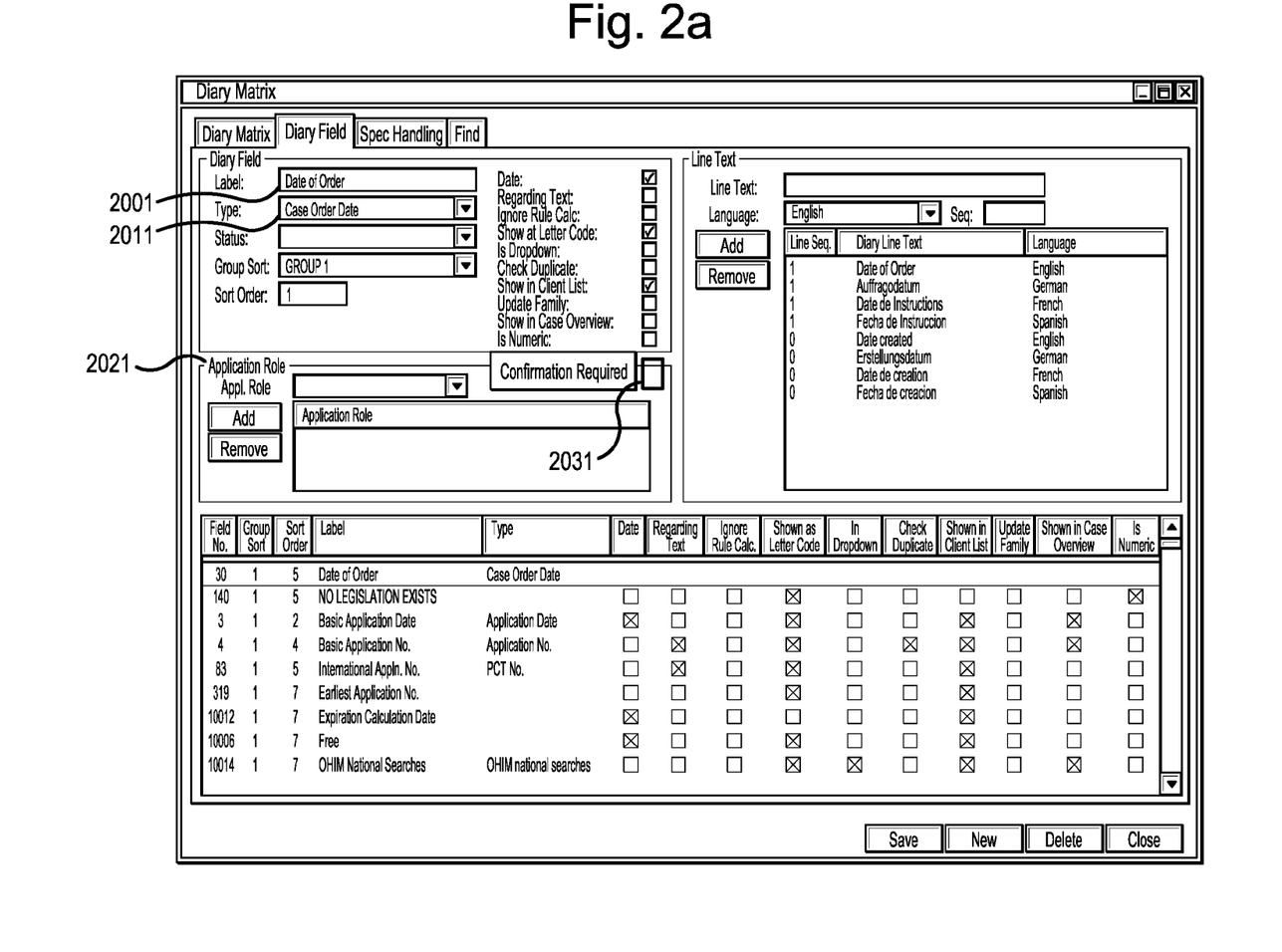
FIG. 2a shows an embodiment of a user interface in a docketing data validation system as described herein.
Figure 2B:
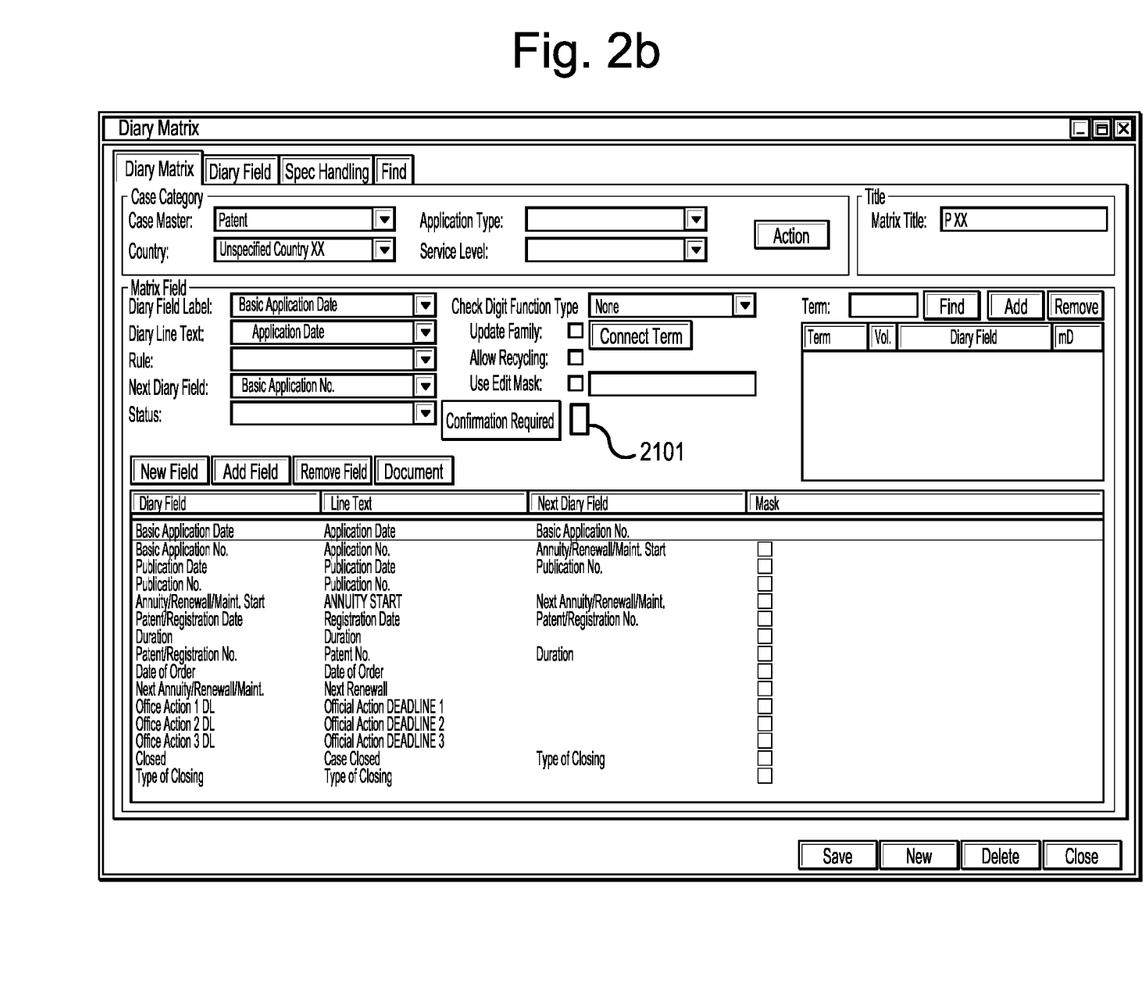
FIG. 2b shows an embodiment of a user interface in a docketing data validation system as described herein.

In the embodiment depicted in FIG. 2*a*, a "confirmation required" check box 2031 is available during field definition. This establishes that confirmation of at least one aspect of the diary field is required before the data entered into that field becomes usable. In other embodiments, the verification or data confirmation aspect may be established at the diary matrix level. An example of a diary field matrix interface having a confirmation required option is depicted in FIG. 2*b*. Setting the "confirmation required" option 2101 at a diary matrix level sets a default property of requiring data validation in the diary field such that when a particular diary matrix is created for a given variable set, fields flagged as "confirmation required" or validation required in the matrix will automatically trigger an embodiment of the data validation process by having a confirmation or validation requirement.

Figure 2C:
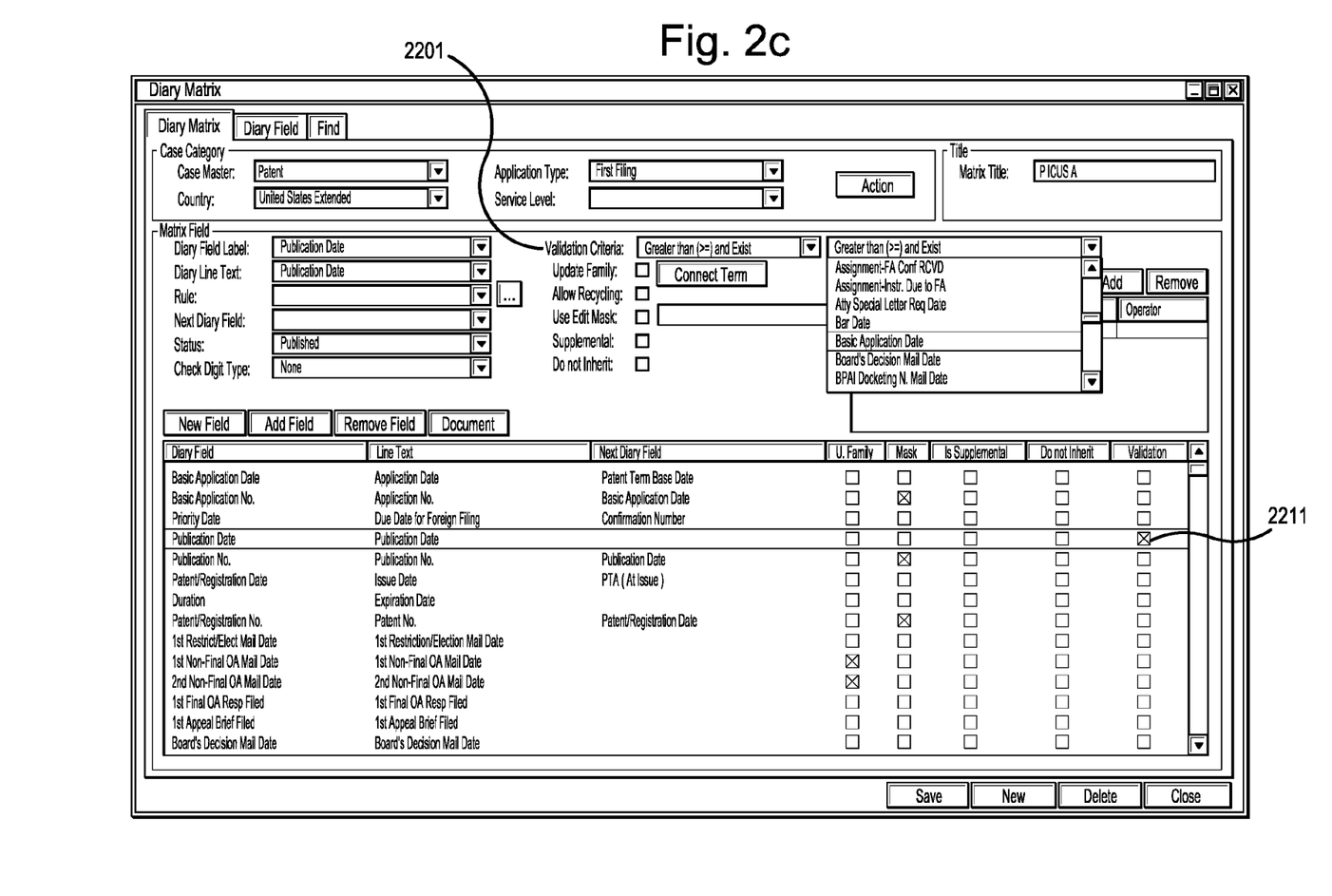
FIG. 2c shows an embodiment of a user interface in a docketing data validation system as described herein.

Validation may also include internal value range checks such as the one depicted in FIG. 2*c*. When a diary field is created, a validation flag 2211 may be set along with validation criteria 2201. In the embodiment depicted, a date field is configured with validation criteria requiring that the date meet or exceed some other date value and that the field not be blank 2201. Such internal checks for data entry may be applied to both initial data entry and confirmation data entry.

Administrators and other admin-level users can create customized diary fields or modify rules associated with each diary field and actions associated with population of a particular diary field. As noted above, one of the particular customizations available for these diary fields is the ability to require that data in a diary field be validated or verified by subsequent data entry and/or through format and/or value range requirements. In some variations, the format requirements associated with an initial data entry may be different from those associated with subsequent data entry. In one variation, a data format for the initial data entry may be MM/DD/YY whereas the date format for a subsequent validation or confirmation data entry may be DD-Month-YYYY. Such an approach may better identify typographical errors during data entry because the different data formats lend themselves to different kinds of data entry mistakes.

In the particular embodiment discussed, each diary field may have an associated validation step. Other embodiments may allow for double, triple, or even further levels of verification depending on the sensitivity of the data and the data quality requirements. This is in addition to any system-based rules for data fields where entries of data are validated to prevent known or common errors (such as entering docketing due-dates that occur before the date of entry, submitting country names for countries that do not exist or are otherwise unrecognized by the system, requiring selection from a drop-down list or similar menu-driven structure or selection from a calendar display, prevention of blank data fields, data masking, etc.)

In the system embodiments discussed herein, there are two types of validation—both of them double entry options. One option is a single user double entry system whereby a user entering data that requires validation must enter the data a second time and the two entries must match. A second option is dual user single entry, where a first user enters data and a second user enters the same data, with the two entries compared for match after the second data entry. In alternate embodiments there may be triple or quadruple data entry requirements depending on the sensitivity and data quality requirements associated with the data being entered. One particular alternate embodiment may include dual user double entry, where both the initial data entry user and the data verification user are both required to double-enter the data to ensure that their entries are correct and consistent separately before further verifying the entries against each-other for actual data verification purposes. Such embodiments may be useful to help reduce simple data entry errors such as typographical errors or incomplete entries.

In some embodiments of the data verification, the initially entered data may be masked so that a user may not simply copy and paste potentially incorrect data from one field to another. In yet further embodiments, the entire copy/paste operation may be disabled or otherwise blocked for entry of verification data to prevent potential bypass of verification processes via cut-and-paste from sources holding incorrect data. Such embodiments of forced data entry may also require the user entering the verification data to be more attentive to the data being entered—thereby further improving potential data quality. In some embodiments a user may be able to see what they type into a field, with the data being masked when the user leaves the field. In other embodiments the data may be masked during entry so that a user may see only a string of dots or asterisks indicating individual characters typed. In further embodiments, a standard mask may be applied to a field after data entry so that even the number of characters in the field cannot be readily ascertained once the data is entered. Yet further embodiments using a double entry paradigm may have an initial and verification data entry field, where the fields are separate and separately masked.

In some embodiments, a validation indicator on a diary field means that after the initial data entry in the diary field, an individual responsible for reviewing or verifying the data entered is first required to re-enter this data without having access to the data already entered. The re-entered data is then matched against the data already entered. If the two data entries match, the data is presumed to be validated and becomes available for use by downstream processes or workflows.

An example of a data validation workflow may begin with a rule set that governs the data type and format that can be entered into a field. In the case of a date field, the rule may be that a date initially entered must be greater than or less than today's date (depending on the type of date being entered—for example, docket dates need to be later than the date of entry, recordation of filing dates need to be prior to the date of entry). An additional rule may detect whether a blank field remains and prevent saving of data or otherwise proceeding further if any blank field is detected. After initial date entry, a double-entry validation paradigm may then create a pop-up window or open up a previously inaccessible data field where the date must be re-entered and the two entries compared to ensure that they both match.

For data validation of already entered data, a data entry screen may be displayed having the same system rules as provided for the initial data entry, or having different rules as appropriate. One particular embodiment where different rules may be appropriate includes the verification of past filing dates. Whereas on initial entry the date entered could be no later than the date of entry, the latest valid date during verification remains the date of entry. Therefore in such an embodiment a verification system may be required to log the date of entry for the initial data and employ a data verification rule where the verified date entered can be no later than the date of initial entry. Further embodiments may use similar rules for fields other than dates, such as city or foreign associate names where a city or country selected during initial data entry limits the available or permitted foreign associate names to only those listed as practicing or associated with a particular city or country.

The data validation screen may, in some embodiments, also require double entry of data. Such embodiments may be useful where data format is important or where validation includes both format and content checking. Double entry in such situations may reduce instances of data validation mismatch by requiring internal consistency of entered data both during initial entry and data validation. If the validation data matches the initially entered data (and, in double-user double-entry embodiments, is internally consistent), the data becomes available for use throughout the system. Otherwise the data is restricted or otherwise indicated as not yet validated.

In some embodiments, un-validated data may be made accessible to other parts of the system or other users but may be indicated at un-validated and therefore potentially incorrect. In other embodiments, un-validated data may be locked from further editing until such data is validated or otherwise marked as correct. Examples of such embodiments may include un-validated deadline dates that are approaching despite the data not yet being validated. In yet further embodiments, administrative-level users or superusers may specifically override the verification requirement to release un-verified data into the system for further use and processing in situations where the data is required before verification may be complete.

Figure 3A:
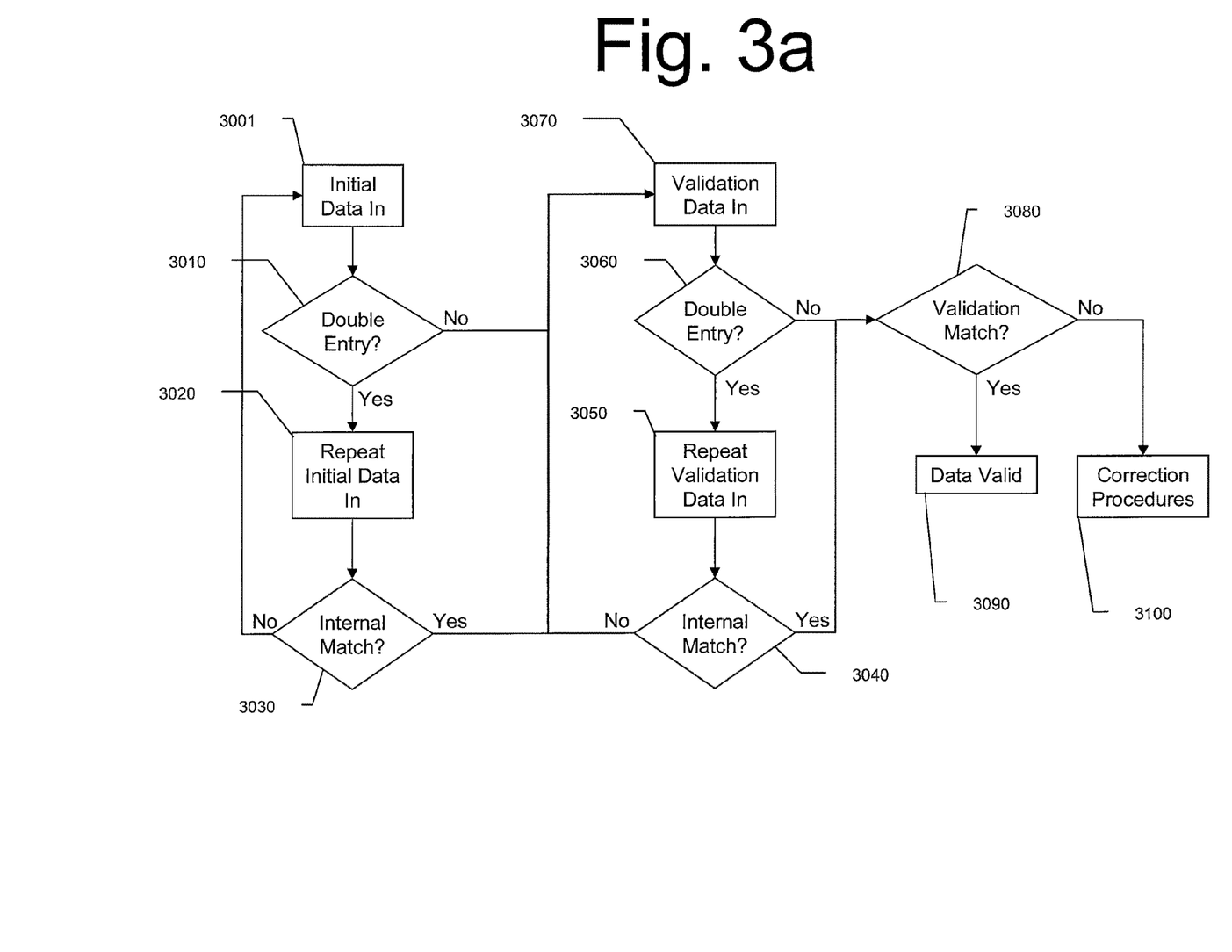
FIG. 3a shows an embodiment of a workflow associated with a docketing data validation system as described herein.

FIG. 3a depicts an embodiment of a validation-type data entry workflow. The workflow may begin with an initial data entry 3001. In double-entry variations 3010 the user or operator making the initial data entry 3001 may be required to re-enter the initial data 3020 to improve the likelihood that the data was entered correctly. In such internally-validated variations, an internal consistency check 3030 is performed to ensure that the first 3001 and second 3020 data entries match.

In situations where the re-entered data does not match the initially entered data, a flag or other indicator may be used to inform the validating user that the data does not match. In such instances a variety of procedures or processes may be implemented to ensure that the correct data is entered into the system. A workflow requiring re-entry of the initial data may be triggered, or review procedures that allow the verifying user or a different user or group of users or administrators to see the initially entered data and compare it against the verification data entry. Various levels of procedures may be implemented to catch and correct different error types. Embodiments of such error flagging and data inconsistency detection may be applied both at the cross-user data consistency level and to check for internal data consistency in multiple entry embodiments.

If there is a mismatch, some variations may re-start the data entry process 3001 and notify the user/operator of the data mismatch. Other variations may indicate a mismatch and allow the user/operator to perform the repeat entry 3020 without requiring a repeat of the initial data entry 3001. Yet further variations may have underlying decision logic that allows for a repeat entry attempt 3020 and, if a mismatch still exists after the second repeat attempt, reverts to the initial data entry 3001 step.

In variations without internal match checking, or upon passing an internal match check 3030, the workflow may proceed to entry of validation data 3070. Preferably, the validation data is entered by someone other than the user/operator performing the initial data entry 3001. After entering the validation data, some variations may have double-entry 3060 for the validation data to improve data consistency and reduce the potential for operator-caused error. The repeat validation data entry 3050 and associated internal match check 3040 steps and variations thereon are similar to those for the repeat initial data entry 3020 and initial internal match 3030.

After successful internal match 3040 (or after initial validation data entry 3070 in single entry validation variations), a validation match operation 3080 may be performed. Upon a successful validation match 3080, the data may be indicated as valid 3090 and data processing operations may proceed on the validated data. If the validation match 3080 fails, correction procedures 3100 may be initiated to address potentially invalid data.

In single-entry or multiple-entry embodiments, validation matching 3080, or cross-user data consistency checks, may include verification of initial entry data as compared to validation data. Some embodiments may not only require data validation but may also require that validation be performed within a specified time period based on the time-sensitive nature of the data being entered. In such instances, verification attempts after the time limit may be flagged or otherwise indicated as errors due to late processing.

In some embodiments, a user inputting double entry data may be given multiple opportunities to enter the verification data 3020. In one particular embodiment, a user may be given three opportunities to enter verification data 3020 for a match 3030 to the initial data before a data quality or data re-entry workflow or process is initiated whereby the initially entered data must be examined or re-entered. Embodiments of multiple re-entry opportunities for verification data may be implemented in situations of single user double entry, double user single entry, or any combination of verification users and data entry repetitions. For embodiments where error tracking may be desired, each instance of data mismatch may be logged for further analysis to determine if the verification data or initial data entry is the source of the mistake.

In multiple-entry embodiments, each user may have multiple attempts to create internal consistency 3030, 3040 of the entered data separately from the overall data verification checks. In some embodiments, there may be a limitation on the number of mismatched multiple entries at an initial data entry stage, but subsequent validation stages may or may not be limited in the number of attempts permitted to create internal consistency. In such embodiments, an initial set of error messages may be displayed indicating a lack of internal consistency between the two data entries. Some embodiments may clear the inconsistent field whereas other embodiments may clear both entered fields and allow for total re-entry. Single-user-multiple-entry embodiments may have a limitation on the number of attempts permitted to create internal consistency, or may be configured to only permit editing of the initial entry field after more than one failed attempt to generate internal consistency in the data through the second entry. Yet further embodiments may include multiple variations on this theme, including requiring full data re-entry when multiple entries at a user level are internally inconsistent or locking down a data field upon entry and only allowing re-entry under limited and restricted conditions (such as requiring administrator approval after a certain number of attempts).

Figure 3B:
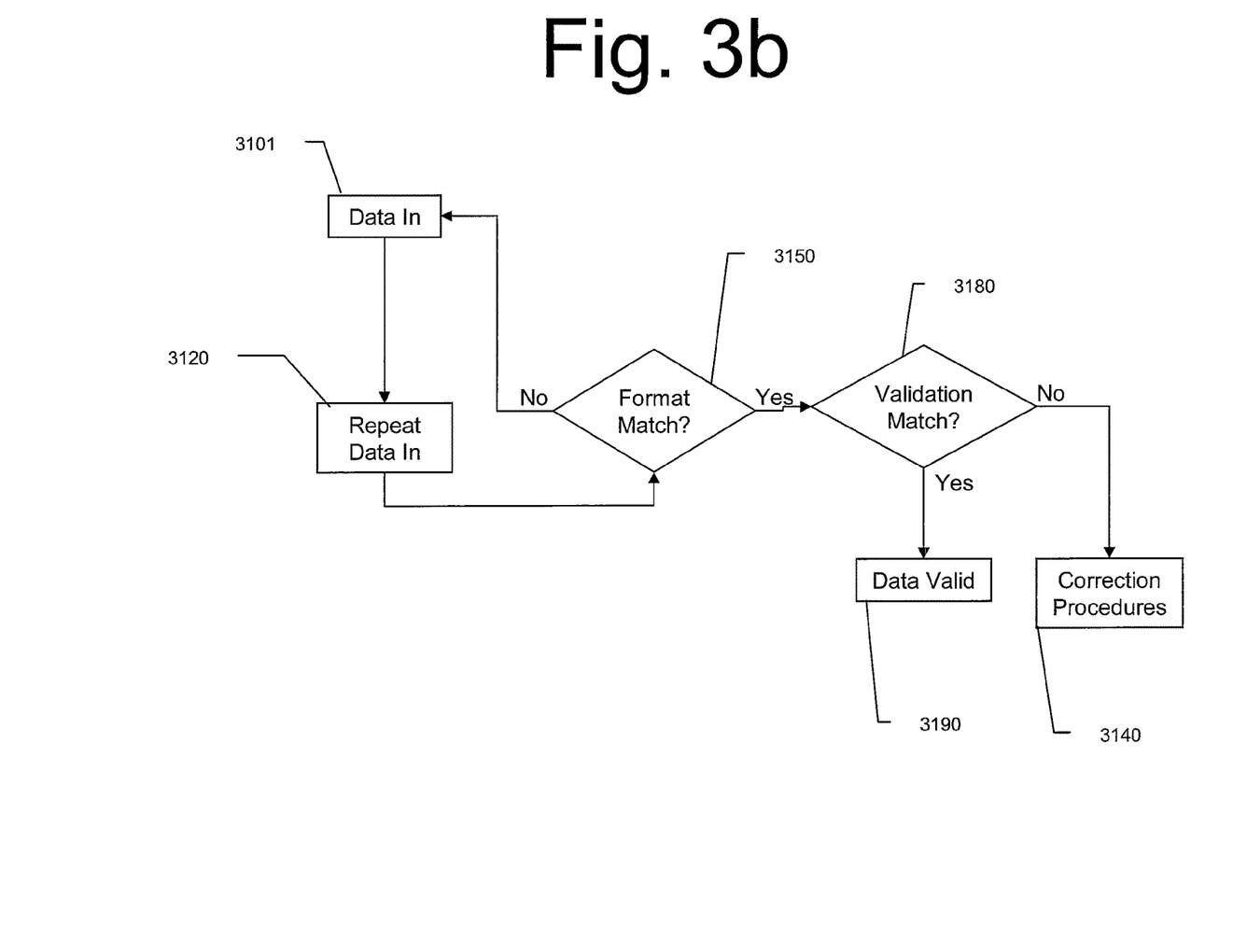
FIG. 3b shows an embodiment of a workflow associated with a docketing data validation system as described herein.

FIG. 3b shows an embodiment of a workflow associated with a single-user double-entry docket data validation approach. The initial data input step 3101 is followed by a subsequent data input step 3120. The accepted data formats in the initial 3101 and repeat 3120 input steps may be the same or they may be different for each step. In an embodiment dealing with dates, for instance, the initial input step 3101 may require that the date be input in MM/DD/YY format. The repeat data input step, however, may require that the date be input in DD-Month-YYYY format, with the month written out. A format match 3150 may be applied that checks one or both of the data input format requirements against the actual data entered. If the format match checks fail, the data entry process may be re-started. If the format match 3150 is valid, then a validation match 3180 may be performed to ensure that both data entries contain the same information. If the validation match passes, the data is marked as valid 3190 and made available to the rest of the system. If the validation match fails, correction procedures 3140 may be initiated. Correction procedures may include triggering a clearing and re-entry of the data, an administrative-level notification of mismatch, a timed or controlled user lock-out, and other suitable procedures to prevent invalid data from entering the system. Further embodiments may include the format validation aspect of the workflow illustrated in a double-user, double-entry solution such as the one shown in FIG. 3a. In such an embodiment, the internal match 3030, 3040 aspects may include, or be supplemented with, format match checking capabilities.

Figure 3C:
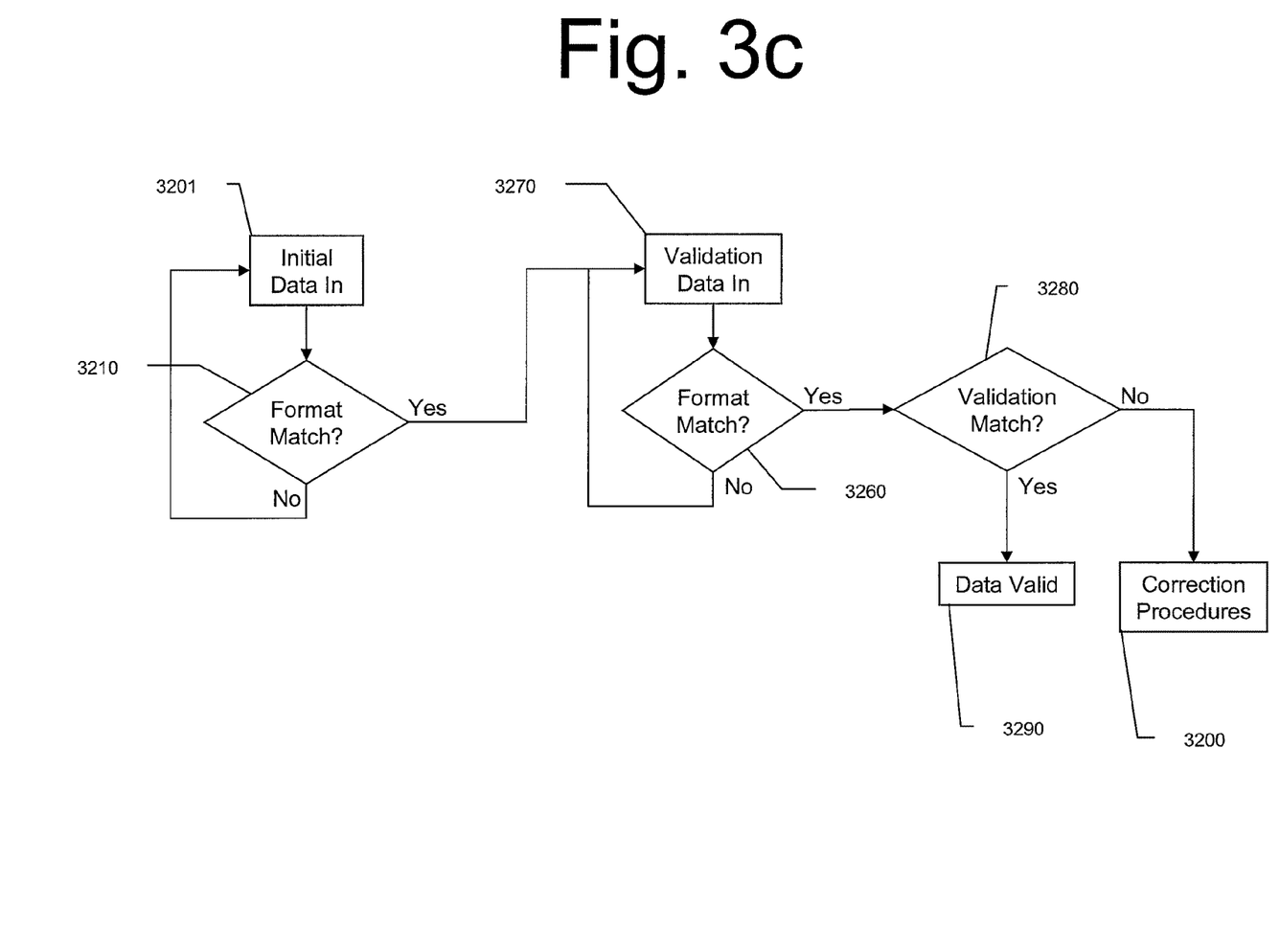
FIG. 3c shows an embodiment of a workflow associated with a docketing data validation system as described herein.

FIG. 3c shows an embodiment of a workflow associated with double-user single-entry docket data validation. In the embodiment shown, an initial data input step 3201 is coupled to a format matching or verification operation 3210. If the data is not entered in proper format (and/or, in some embodiments, with an expected value range), it is cleared and must be re-entered. In some embodiments, repeated failures may trigger administrative notification or other correction procedures 3200. After the properly-formatted initial data is input, validation data may be input 3270 by another user. The validation data may also be associated with a format matching/validation operation 3260. The data format required for the validation data may be different than the one required for the initial data. Such an approach may be useful to ensure that commonly-occurring data entry errors are not repeated in both data entry steps. Once the properly-formatted initial and validation data are input, a validation match 3280 determines if the input data is valid. If valid, the data is marked as such 3290 and made accessible to the rest of the system. If not valid, correction procedures 3200 similar to those discussed previously and also described later in this document may be implemented.

In some variations, format matching may be applied at each data input step. In a double-user, double-entry embodiment, each data entry step may have a different data format requirement and data format validation logic may be implemented for each of the data entry operations. In some variations, data that fails a format match or an internal consistency check may be cleared from an input interface or any storage location prior to allowing a repeat data entry attempt. This may prevent accidental input of incorrect data to the system.

Embodiments of data quality or data re-entry workflows triggered after a user exceeds the permitted number or attempts for internal consistency may include procedures that can only be accessed or enabled by administrators or super-users. Further embodiments may require a waiting or delay period before permitting further entry attempts. Yet further embodiments may assign the failed data entry task to another operator and/or trigger a system configuration check to ensure that the data entry tools/devices have the proper associated settings.

In one embodiment, administrative or super-user permission may be required for further internal consistency attempts or to re-set the failed attempt counter. In other embodiments, an administrator-initiated or automatically-triggered system check may be triggered along with a notification to an administrator or super-user. In yet further embodiments, administrative or super-user intervention may be required to clear the initially entered data and re-start the data entry workflow upon data verification failure. Yet further embodiments may employ data re-entry and error logging schemes whereby the initial and verification data are displayed to an administrative-level or other authorized user for comparison to determine whether there is indeed a serious disparity between the data or whether the mismatch is caused by formatting errors (such as dashes instead of backslashes or dots instead of spaces). The associated error logging techniques and paradigms may also indicate error types and sources to determine whether errors occur at initial entry or at validation entry.

Data verification or validation may be complete or partial. Diary entries may have multiple data types and data formats contained therein, and different portions of data may have different validation requirements or validation user levels. In one embodiment, validation data may be required to match exactly (format, content, and case) with the initially entered data. Such embodiments may be useful for highly sensitive or very specific data such as dates associated with or used by downstream automated systems or similar key values that are not only content but also format or layout dependent with respect to downstream processing. Other embodiments may employ looser validation rules or alternative validation rules to focus the attention of the person entering the validation data. Such embodiments may be useful for case-insensitive data (such as country names) or format-insensitive data. Alternative embodiments may require initial data entry of a date in one particular format (such as MM/DD/YYYY) and verification data entry in a different format (such as DD-Month-YY) to ensure that at least one of the data entering parties must mentally re-format the data before entering it and therefore pay more attention to the actual content of the data. Yet further embodiments may include date-range limitations or requirements that are fixed or dynamic. In one embodiment, a date may need to be later than today's date. In another embodiment, a date may need to fall into a specified range based on another date associated with particular case docket, such as a client deadline that must be between 6 and 2 weeks before an actual filing deadline.

For embodiments using partial data validation, the validation rules and levels of flexibility may be determined by predefined system rules. In other embodiments, differing levels of flexibility with respect to validation may be user-definable. In such embodiments, an administrator or other high-level user creating a diary field may select from a range of options such as "case insensitive" or select a range of suitable date formats to reduce format-based data errors where data format is not a factor but validity of data content is. In further embodiments high-level users may have the ability to write custom format or layout exception or enforcement scripts that parse data and isolate the content from the format or combine the content and format to ensure that only the particular portions requiring validation or duplication are checked for. Further embodiments may include back-end or user-configurable hash functions for selections from predefined menu lists such that processing and speed efficiencies may be realized during data validation by comparing an index number associated with a selected value instead of the selected value itself.

In some embodiments, a data quarantine procedure may be implemented in the event of a data validation failure. Data quarantine procedures may include making a determination of which data is likely to be more correct, or simply presuming that the validation data is more likely to be correct, and isolating the likely correct data for comparison and analysis against the incorrect data to determine possible causes for the data discrepancy. In other embodiments, a data quarantine procedure may be associated with a separate data quarantine storage area. In yet further embodiments, data quarantine may trigger another multiple-input data validation workflow based on the data determined or presumed more likely to be correct, but the quarantine-based workflow may be limited to or controlled by administrators or super-users.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A docket data management system, the system comprising:
   a processor;
   a system definition interface for defining customized fields, said defining including a designation that docket data entered into a field is to be validated;
   a data entry user interface configured to receive a first version of the docket data in a field that has been designated as requiring validation;
   a data validation screen configured to receive a second version of the docket data, the second version of the docket data being independent of the first version and requiring the same content as the first version;
   an interface data storage portion that stores the first version of the docket data, the first version of the docket data being stored in the interface data storage portion prior to receipt of the second version of the docket data at the data validation screen;
   an accessible data storage portion storing validated docket data, the accessible data storage portion being accessible by the rest of the docket data management system; and
   a data validation portion that generates a validation data entry workflow in accordance with the designation that docket data is to be validated and performs the workflow by
      automatically comparing, with the processor, the second version of the docket data received via the data validation screen to the first version of the docket data stored in the interface data storage portion, and
      causing the first version of the docket data to be automatically copied to the accessible data storage portion as the validated docket data in response to a comparison result indicating that the first version of the docket data stored in the interface data storage portion matches the second version of the docket data received via the data validation screen; and the interface data storage portion permits access by the data validation portion and the data entry user interface and prohibits access of the first version of the docket data by data validation screen.

2. The system of claim 1, wherein the system definition interface includes a setting that causes the first version of the docket data in the interface storage portion to be identified as potentially invalid docket data upon a comparison result indicating that the first version of the docket data does not match the second version of the docket data.

3. The system of claim 1, wherein the system definition interface includes defining one or more validation parameters for the field, the data entry user interface includes a validation check portion that compares said first version of the docket data against said one or more validation parameters and prevents said first version of the docket data from being stored in said interface data storage portion if said validation parameters are not met.

4. The system of claim 3, the system further comprising a data quarantine portion where potentially invalid docket data is stored, wherein said validation data entry workflow includes a data quarantine procedure that is performed on potentially invalid docket data stored in the data quarantine portion.

5. The system of claim 1, wherein said system definition interface allows designation of a data pattern format requirement for the docket data, wherein the data entry user interface is configured with a first data pattern format requirement and the data validation screen is configured with a second data pattern format requirement, and where the first and second data pattern format are required to be different in accordance with the designation made in the system definition interface.

6. The system of claim 3, where the validation parameters include at least one of a particular data pattern format and a data value range.

7. The system of claim 6, where the data value range is a date range based on a date previously entered into the system.

8. The system of claim 1, where a first time data input portion where docket data entered using the data entry user interface the first time is associated with a first data pattern format requirement and a second time data input portion where docket data entered using the data entry user interface the second time is associated with a second data pattern format requirement; and where the first and second data pattern format requirements are different.

9. The system of claim 1, where the data entry user interface is configured such that said first version of the docket data must be input a first time and a second time, and where the first version of the docket data input the first time must match the first version of the docket data input the second time before said first version of the docket data can be stored in said interface data storage portion.

10. A method of processing docketing data in a docket management system, the method comprising:
    inputting, via a system definition interface, a designation that docketing data entered into a field is to be validated;
    first receiving, via a data entry user interface, a first version of the docketing data;
    based on the designation that docketing data is to be validated, second receiving, via a data validation screen, a second version the docketing data, the second version of the docketing data being independent of the first version of the docketing data and requiring the same content as the first version;
    storing, in an interface data storage portion, the first received docketing data, the first version of the docketing data being stored in the interface data storage portion prior to receipt of the second version of the docketing data at the data validation screen; and the first version of the docketing data in the interface data storage portion being accessible by the data entry user interface but not by the data validation screen;

comparing, by a data validation portion, the second version of the docketing data to the stored first version of the docketing data;

validating the stored first version of the docketing data as validated docketing data in response to a comparison result indicating that the received second version of the docketing data matches the stored first version of the docketing data; and copying the validated docketing data to an accessible data storage portion, the accessible data storage portion making the validated docketing data available to the rest of the docket management system.

11. The method of claim 10, wherein said validating includes moving the validated data into a validated data storage area and making the validated data openly accessible.

12. The method of claim 10, wherein said first receiving includes a first entry of said first version of the docketing data and a second entry of said first version of the docketing data, and where the first version of the docketing data is received only if the first entry matches the second entry.

13. The method of claim 12, where a first mismatch between the first and second versions of the docketing data causes the first and second versions of the docketing data to be cleared such that the first and second entries must be repeated.

14. The method of claim 13, where a second mismatch between the first and second versions of the docketing data, detected after said first mismatch, causes the first data entry interface to become locked out of further entry attempt until unlocked by an administrative-level user.

15. The method of claim 10, the method further comprising performing data quarantine procedure where either the first or second version of the docketing data is isolated and reviewed to determine accuracy and correctness in response to a comparison result indicating a mismatch between the received second version of the docketing data and the stored first version of the docketing data.

16. The method of claim 10, where said first receiving includes receiving the first version of the docketing data in a first required data pattern format such that said first version of the docketing data is not received unless provided in the first required data pattern format;

said second receiving includes receiving the second version of the docketing data in a second required data pattern format such that said second version of the docketing data is not received unless provided in the second required data pattern format; and said second required data pattern format is different from said first required data pattern format.

17. The method of claim 12, where said first version of the docketing data is associated with a first required data pattern format such that the first entry data is not received unless provided in the first required data pattern format;

said second version of the docketing data is associated with a second required data pattern format such that the second version of the docketing data is not received unless provided in the second required data pattern format; and said first and second required data pattern formats are different.

18. The method of claim 10, where said first receiving includes applying a validation parameter such that said first version data is not received unless is meets the validation parameter.

19. The method of claim 18, where the validation parameter is a data value range based on at least one of a fixed data value and a data value previously stored in the system as accessible data.

20. The method of claim 19, where the data value range is a date range based on a date previously entered into the system.

* * * * *